Figure 1:
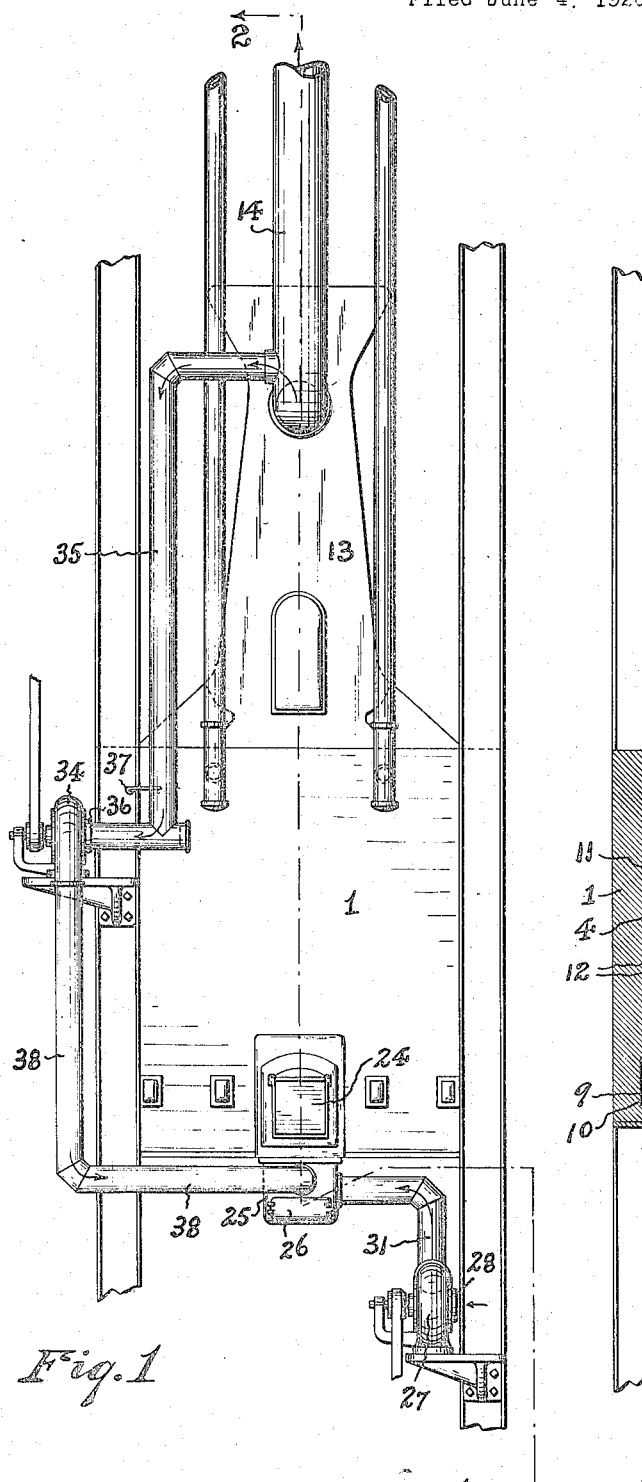

Patented Nov. 18, 1924.

1,515,778

UNITED STATES PATENT OFFICE.

RALPH W. E. LEACH, OF BOSTON, MASSACHUSETTS.

METHOD AND APPARATUS FOR HEAT GENERATION AND CONTROL.

Application filed June 4, 1920. Serial No. 386,636.

*To all whom it may concern:*

Be it known that I, RALPH W. E. LEACH, a citizen of the United States, residing at Boston, in the county of Suffolk and State of Massachusetts, have invented certain new and useful Improvements in Methods and Apparatus for Heat Generation and Control; and I do hereby declare the following to be a full, clear, and exact description of the invention, such as will enable others skilled in the art to which it appertains to make and use the same, reference being had to the accompanying drawings and to characters of reference marked thereon, which form a part of this specification.

The present invention relates, generally, to the art of generating and controlling convectional heat; and the invention has reference, more particularly, to improvements in both a method of and apparatus for generating and controlling heat in furnaces, kilns, retorts ovens and similar apparatus.

In prior inventions of this character it has been attempted to control the heat generated in a furnace or other similar structure by limiting the volume of air delivered through the fuel bed with the result that a great portion of the combustible gases contained in the fuel are driven off unconsumed, that portion that is consumed generating an intense heat at a localized spot or place in the fuel bed. Such methods of attempted control have, therefore, defeated the very purpose for which they were designed as, not only is the amount and quality of the heat generated not controlled in any way, but a great portion of the heat units contained in the fuel is dissipated. Various means and methods have been devised for consuming such unconsumed gases ranging from ordinary well known smoke consuming devices to means for injecting oxygen containing vapor into the hot unconsumed gases for the purpose of consuming the same at some point above the fuel bed.

In my present invention I have obviated the objections to prior methods and apparatus and have devised a novel method of heat generation and control in which a constant volume of air and non-combustible gases, depending on the cubical contents of the firebox of the furnace, is passed through the fuel bed, the proportion of non-combustible gases to the air depending upon the degree of heat it is desired to maintain or generate in the furnace and the amount of air being sufficient to provide oxygen enough to completely consume all conbustible gases generated. For economical operation it is always advantageous to utilize heated air, or other oxygen containing mixture, for use in heat generating furnaces, and I have, as one of the principal objects of my invention, utilized as a non-combustible gas the highly heated gaseous products of the complete combustion and mix such gases with air whereby the air is heated, and am enabled to obtain such non-combustible gas at a desired temperature by taking such gas from the desired point in the flue leading from the furnace. This non-combustible gas at the desired temperature is led back from the flue and injected beneath and through the fuel bed in the desired quantity which, as stated above, depends upon the amount or degree of heat it is desired to generate in the furnace. The heat units abstracted from the non-combustible flue gases, on their passage from the flue to the point of mixture with the air prior to passage through the fuel bed, are returned to such gas again by the heat of combustion in the furnace.

Other objects of the present invention, not at this time more particularly enumerated, will be clearly understood from the following detailed discription of the same.

The invention is clearly illustrated in the accompanying drawings, in which:—

Figure 2:
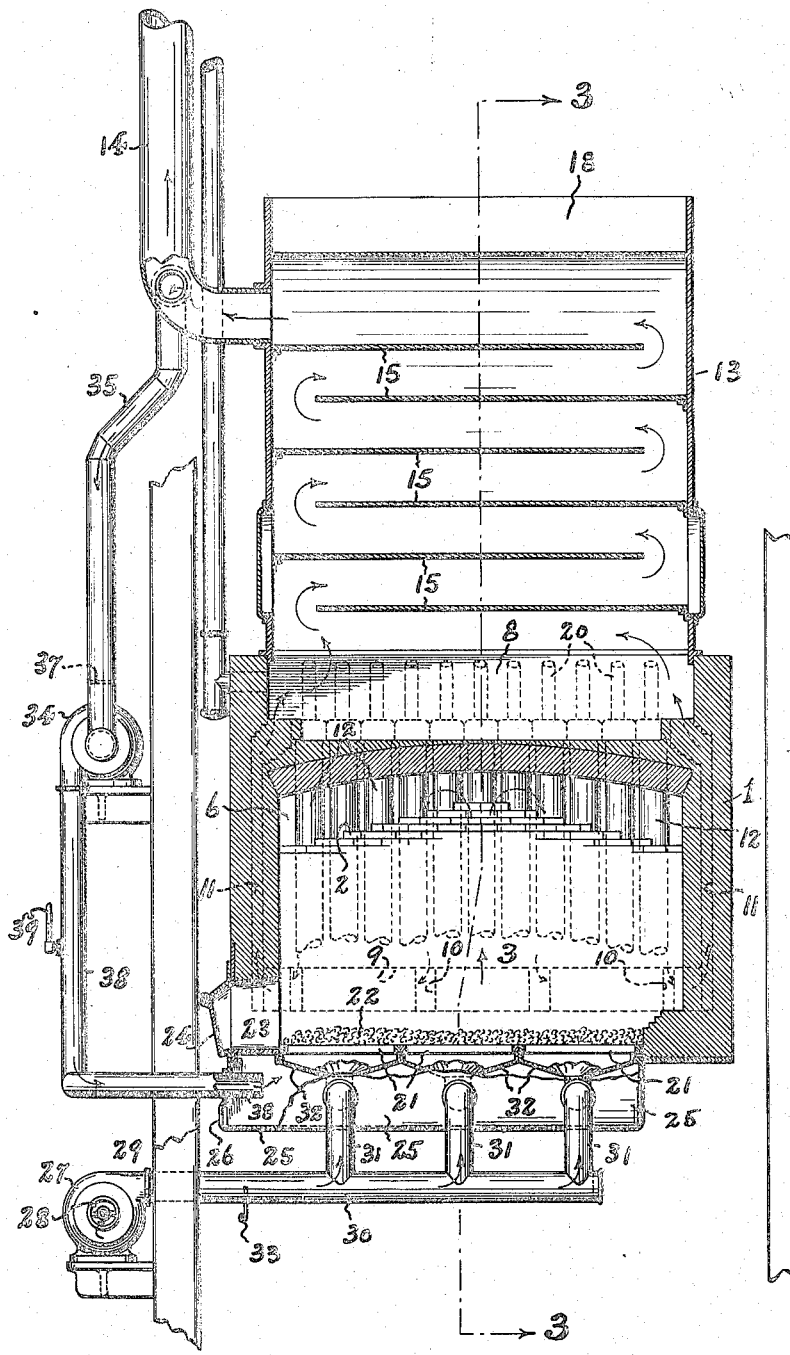

Figure 1 is a front elevation of a char kiln and drier, made according to and embodying the principles of my present invention; Figure 2 is a longitudinal vertical section through the same, taken on line 2—2 in said Figure 1; and Figure 3 is a transverse section of the same, taken on line 3—3 in said Figure 2.

Similar characters of reference are employed in all of the above-described views, to indicate corresponding parts.

Referring now to said drawings, I have selected and shown therein, to illustrate the application of the pricples of my invention both as to the method of controlling the heat and as to apparatus of the kind above mentioned operating under said method, a combined char kiln and drier, the same comprising a main structure or housing 1 usually built of brick, and provided in its interior with a pair of laterally spaced longitudinally extending partition walls 2 arranged to provide a centrally positioned longitudinally extending combustion chamber 3 intermediate said walls, and retort chambers 4 intermediate said partition walls 2 and the outer side walls of said housing 1. Disposed above said combustion chamber 3 is a top arch or horizontal partition 5. The upper ends of said partition walls 2 terminate short of said top arch or partition 5 so as to provide passages 6, through which the products of combustion liberated within said combustion chamber may pass into said retort chambers 4. Above said top arch or partition 5 is a pair of longitudinal extending laterally spaced walls 7 enclosing a vent chamber 8. Provided in the walls of said housing 1 adjacent to the lower ends of said retort chambers 4 are collecting flue passages 9, access to which is gained from the bottom or lower ends of said retort chambers through suitable intercommunicating ports 10. Said collecting flue passages 9 communicate with riser flues 11, which extend upwardly through the front and rear walls of said housing 1 to discharge into said vent chamber 8.

Mounted to extend vertically downward through each retort chamber 4 is a plurality of retorts or containers 12 into which the material to be treated is fed. In some kilns of the type herein described, the material is subjected to a preliminary drying before the same is delivered to the retorts or containers 12, and to this end a drier means is mounted upon the housing 1. This drier comprises a hood 13 having its lower end connected in communication with said vent chamber 8, so that the products of combustion, after escaping from the retort chamber 4, pass upwardly through its interior. A stack 14 is connected in communication with the upper end of said hood. In order to provide a circulation of the vented products of combustion through said hood 13, to properly distribute the heat thereof in contact with the sides of the hood, a series of vertically spaced and staggered horizontal distributer plates 15 are arranged within the interior of said hood. The outer walls of said hood are formed to provide a plurality of downwardly and outwardly inclined exterior baffles 16. Connected between the end walls of said hood and outwardly spaced from said baffles 16, are a plurality of vertically spaced downwardly and inwardly inclined deflector plates 17, the spaces intermediate the same being open to the atmosphere. The upper exterior end of said hood is formed to provide a receiving hopper 18 into which the material to be treated is fed. The said material cascades or tumbles downwardly over the baffles 16, being controlled in its movement by the deflector plates 17. The heat of the products of combustion passing through the interior of said hood 13 is transmitted to the baffles 16 and thus to the material passing over the same, whereby said material is relieved of any moisture content it may possess. Connected with the lower end of each set of baffles 16 is a chute plate 19 from which lead delivery passages or ducts 20 through which the material falls into the upper receiving ends of said retorts or containers 12.

Located at the bottom of said combustion chamber 3 are suitably arranged grates 21 for supporting a bed of combustible fuel 22. The forward wall of said housing 1 is provided with an opening 23, closed by a suitable door 24, giving access to the combustion chamber 3, and through which fuel may be fed to said grates 21. Arranged beneath said grates 21 is an air tight ash-pan 25, the same being provided with an air tight door 26 at its forward end, through the opening of which ashes may be removed.

The reference-character 27 indicates an air blower, adapted to be suitably driven from any desired source of power. Air entering the intake end 28 of said blower, is driven from its discharge end 29 through an air delivery duct or pipe 30. Connected with said air delivery duct or pipe 30 are one or more branch pipes or ducts 31, which pass through the wall of said ash-pan 25 so as to enter the interior of the latter beneath said grates 21. The discharge ends of said branch pipes or ducts 31 terminate in distributer heads 32, which are arranged to extend over a desired proportion of the bottom area of the grates 21, so that air delivered from the blower is fed or passed directly through the thus enclosed portion of the grates 21 upwardly through the fuel bed 22, thereby furnishing oxygen requisite to the degree of fuel combustion desired to be sustained and completed for generating a constant volume of neutral gas at the desired temperatures. Arranged at a suitable location in the line of said air delivery duct or pipe 30 is an adjustable blast gate 33 of any desired construction, the same being designed to control the volume of air admitted to the fuel bed 22.

The reference-character 34 indicates an exhaust fan adapted to be suitably driven from any desired source of power. Connected with the stack 14, or with any other part of the apparatus through which pass the products of completed combustion vented from the retort chambers, is a gas intake or induction pipe or duct 35 leading to and connected with the intake end 36 of said exhaust fan 34. Said gas intake or induction pipe or duct 35 is provided with a suitably located adjustable damper 37 for regulating more or less the flow of gas therethrough under the pull of the fan. Connected with the discharge end of said fan 34 is a discharge pipe or duct 38 leading to and communicating with the interior of said ash pan 25, so that gases or products of completed combustion induced by the fan 34 are delivered beneath the grates 21 whereby the same, entering through the exposed area of said grates, pass upwardly through the fuel bed 22 to be reheated to the desired temperature, and to thence pass through the combustion chamber 3 and into the retort chambers 4 to provide therein a constant volume of hot non-combustible gas or products of completed combustion in addition to the volume of initial products of completed combustion resulting from the burning of the fuel bed.

In the operation of the apparatus the heating of the retorts charged with the material to be revivified is to be accomplished by the direct application to the exterior surfaces of the retorts or containers 12 of a volume of the products of complete combustion in combination with the re-heated returned neutral gas, at the desired degree of temperature (which, for example, we will take to be approximately one thousand degrees F.), rather than depending upon the radiation of heat from the fuel bed, or upon a smaller and unequally distributed volume of the products of combustion raised to a much greater initial degree of temperature. To this end a proportion of the products of combustion, which retain considerable heat after they are discharged from the retort chambers 4, are induced by the exhaust fan 34 to flow back beneath the grates of the combustion chamber, so that the same are thereupon passed through the fuel bed 22. Simultaneously with such delivery of the returned products of combustion upwardly through the fuel bed 22, the air blower 27 operates to deliver into the said fuel bed a sufficient volume of air adapted to supply a requisite amount of oxygen to combust that proportion of the fuel adapted to liberate the amount of heat which will replace the temperature losses of the returned products of combustion. As a simple illustration, if the returned products of combustion when delivered beneath the grates possess a temperature of approximately six hundred degrees F., then sufficient air will be supplied to the fuel to combust that amount of said fuel which will liberate enough heat to replace the loss of four hundred degrees F. sustained by said returned products of combustion, or, in other words, to again bring the temperature of the latter as they again pass through the combustion chamber 3, up to the desired one thousand degrees F. The gas temperature being controlled entirely by the volume of neutral gas returned, which regulates the amount of fuel combustion on the grates, since this gas is non-combustible, and practically controls the air supply. In order to readily ascertain the temperature loss of the returned products of combustion, the discharge pipe 38 of the fan 34 may be provided with a suitably connected thermometer 39, for indicating the temperature of the gases discharged or passing therethrough.

The volume of products of combustion to be thus returned to the combustion chamber 3 for reheating, as well as the volume of air to be delivered to the fuel bed, will have a direct relation to the respective speeds of the fan 34 and blower 27, and, of course, may be more or less varied as desired, as well as controlled by the respective regulating damper 37 in the one case and the blast gate 33 in the other. The volume of neutral gas in all cases regulates the air supply and rate of combustion. In operation, however, the return flow of the products of completed combustion will vary according to desired temperature required, whereas the flow of air will be varied according to the amount of natural gas returned and the fuel combusted necessary to the proper reheating of the returned products of completed combustion to desired temperature, the total gas volume remaining constant at all times.

It will be apparent that not only does the novel method of heat control as exemplified by the described apparatus provide for the utilization of the heat of the returned products of completed combustion, but also makes for considerable economy in the consumption of fuel, while at the same time providing a maximum constant volume of the products of completed combustion at predetermined temperature distributed in the form of convectional heat around the retorts or containers 12 whereby all said retorts are uniformly heated since the volume of heated gas is equal to the cubical capacity of the furnace and consequently the material therein receives equal treatment throughout in a given period of time.

My novel method may be employed with any type of furnace, oven, kiln or the like designed to treat any kind of material by the application of convectional heat thereto at either uniform or variable temperatures.

While the apparatus as illustrated in the drawings is arranged to utilize solid fuel (such as coal) in the combustion chamber, it will be clearly understood that the primary air and neutral combusted gas may be delivered to the combustion chamber or burner to support the combustion of liquid or gaseous fuel if desired.

I am aware that some changes may be made in the construction of the apparatus as above described and as illustrated in the drawings, without departing from the scope of and while still retaining the general principles of my present invention. Hence, I do not limit my invention to the exact arrangements and combinations of parts, as described in the foregoing specification, nor do I confine myself to the exact details of the construction of the various parts as illustrated in the accompanying drawings.

I claim:—

1. In an apparatus of the kind described, the combination with a housing providing a fuel combustion chamber and a retort chamber in communication with the latter, of material containers located within said retort chamber and around which pass the products of combustion flowing from said combustion chamber, said housing having flues for discharging said products of combustion from said retort chamber, a fuel supporting grate in said combustion chamber, an air tight compartment beneath said grate, means for returning a predetermined proportion of products of completed combustion after discharge from said retort chamber into said air tight compartment to pass thence upwardly through the fuel bed supported by said grate, and an air delivery means having discharge means arranged beneath a portion of the area of said grate for delivering air to support combustion of fuel mixed with returned products of completed combustion sufficient to reheat said returned products of completed combustion and regulate the resultant of the additional fuel burned to the desired temperature degree and at maintained desired volume.

2. In an apparatus of the kind described, the combination with a housing providing a fuel combustion chamber and a retort chamber in communication with the latter, of material containers located within said retort chamber around which pass the products of combustion flowing from said combustion chamber, said housing having flues for discharging said products of combustion from said retort chamber, a fuel supporting grate in said combustion chamber, an air tight compartment beneath said grate, a conduit for leading a predetermined proportion of the products of combustion vented from said retort chamber back into said air tight compartment to pass thence upwardly through a fuel bed supported by said grate, an exhaust fan connected in the line of said conduit to induce the backward flow of said products through said conduit, an air blower, and an air conduit connected between said blower and the under side of a portion of said grate area for delivering primary air to support combustion of fuel sufficient to reheat said returned products of combustion in combination with the products of combustion of the fuel on said grate to the desired temperature degree.

3. In an apparatus of the kind described, the combination with a housing providing a fuel combustion chamber and a retort chamber communicating with the latter, of a plurality of material containers located within said retort chamber, said housing having a vent chamber and flues interconnecting the same with said retort chamber, a drier hood mounted on said housing to receive the products of combustion flowing from said vent chamber, a stack for venting the products of combustion from said drier hood, means for inducing back into said combustion chamber a predetermined proportion of said products of combustion vented through said stack, and means for delivering to said combustion chamber primary air to support combustion of fuel sufficient to reheat said returned products of combustion in combination with the products of combustion of said fuel to the desired temperature degree.

4. In an apparatus of the kind described, the combination with a housing providing a fuel combustion chamber and a retort chamber communicating with the latter, of a plurality of material containers located within said retort chamber, said housing having a vent chamber and flues interconnecting the same with said retort chamber, a drier hood mounted on said housing to receive the products of combustion flowing from said vent chamber, a stack for venting the products of combustion from said drier hood, a fuel supporting grate in said combustion chamber, an air tight compartment beneath said grate, means for returning a predetermined proportion of the products of combustion vented through said stack back into said air tight compartment to pass thence upwardly through a fuel bed supported by said grate, and an air delivery means having discharge means arranged beneath a portion of the area of said grate for delivering air to support combustion of fuel sufficient to reheat said returned products of combustion in combination with the products of combustion of the fuel on said grate to the desired temperature degree.

5. In an apparatus of the kind described, the combination with a housing providing a fuel combustion chamber and a retort chamber communicating with the latter, of a plurality of material containers located within said retort chamber, said housing having a vent chamber and flues interconnecting the same with said retort chamber, a drier hood mounted on said housing to receive the products of combustion flowing from said vent chamber, a stack for venting the products of combustion from said drier hood, a fuel supporting grate in said combustion chamber, an air tight compartment beneath said grate, a conduit between said stack and said air tight compartment, an exhaust fan connected in the line of said conduit to induce back through the latter a predetermined proportion of the products of combustion for delivery to said air tight compartment to thence pass upwardly through the fuel bed on said grate, an air blower, and an air conduit connected between said blower and the under side of a portion of said grate area for delivering primary air to support combustion of fuel sufficient to reheat said returned products of combustion in combination with the products of combustion of the fuel on said grate to the desired temperature degree.

In testimony, that I claim the invention set forth above I have hereunto set my hand this twenty-eighth day of May, 1920.

RALPH W. E. LEACH.

Witnesses:
EMMA A. GILLETTE,
EDWARD E. CALL.